UNITED STATES PATENT OFFICE.

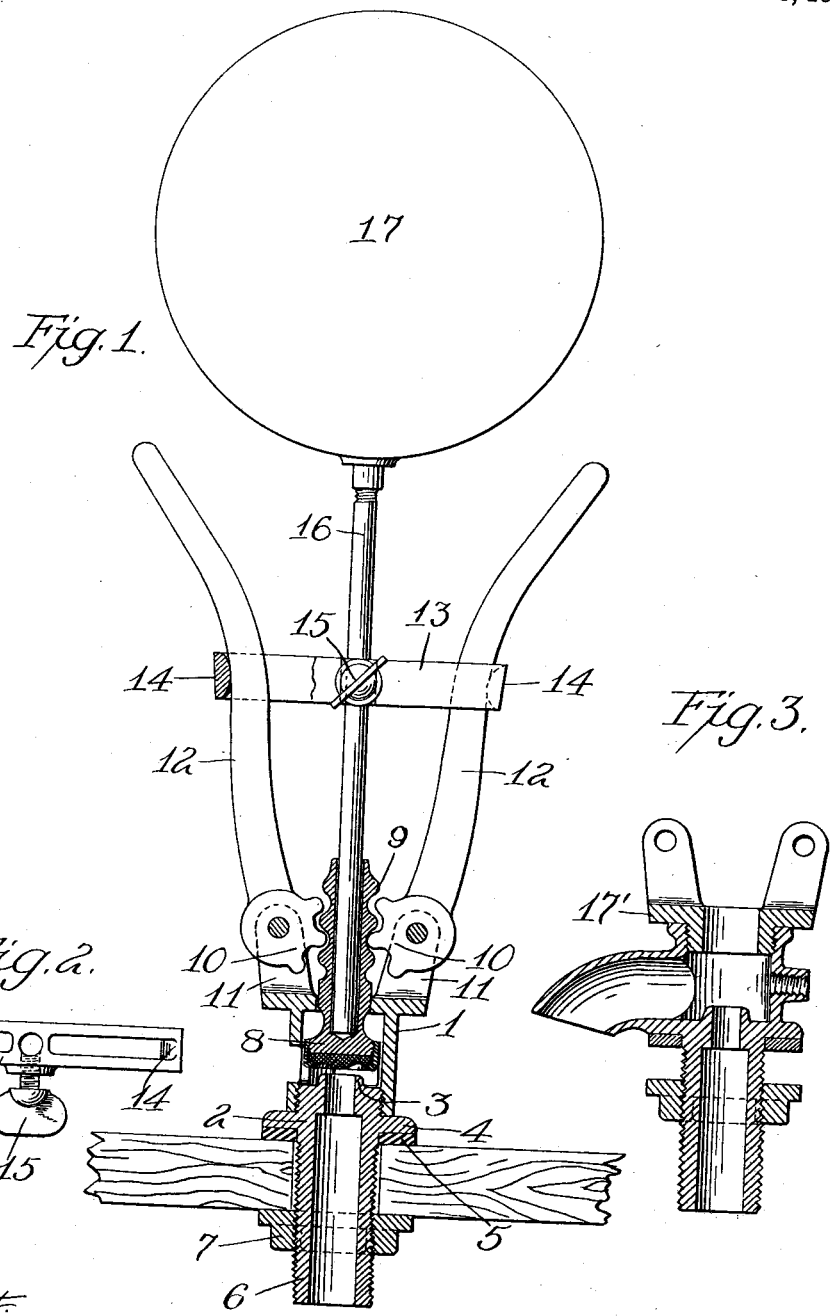

WILLIAM F. KULLBERG, OF WASHINGTON, DISTRICT OF COLUMBIA.

FLOAT-CONTROLLED VALVE.

1,063,807.   Specification of Letters Patent.   Patented June 3, 1913.

Application filed March 14, 1912. Serial No. 683,860.

*To all whom it may concern:*

Be it known that I, WILLIAM F. KULLBERG, citizen of the United States, residing at Washington, District of Columbia, have invented certain new and useful Improvements in Float-Controlled Valves, of which the following is a specification.

My invention relates to float controlled valves for flush tanks, and it consists in the features, combination and arrangement of parts hereinafter described and particularly pointed out in the claims.

In the accompanying drawings, Figure 1 is an elevation of a valve mechanism embodying my invention, parts being shown in section. Fig. 2 is a view of a detail. Fig. 3 is a view of a modification.

In this drawing, 1 indicates the valve casing consisting of a shell internally screw threaded at its lower end and receiving a valve seat member 2, which is screw threaded thereinto, and is provided with a projecting rim 3 forming the valve seat. This member is flanged at 4, and suitable packing is provided at 5. It also has a screw threaded extension 6, and a nut 7. The valve 8, of substantially ordinary form, has its stem guided in the top plate of the casing, and this stem is provided with a series of circumferential ribs 9, which are engaged by teeth of segments 10, which are journaled in arms 11, extending up from the valve casing. These segments are provided with arms 12, one for each, extending upwardly and curving outwardly at their upper ends. These arms are engaged by a cross-bar 13, formed of a casting having arms with a guideway or slot between them, and with cross pieces 14, joining their outer ends. This cross-bar is fixed adjustably by a set screw 15 to a stem 16, of a float 17. The lower end of this stem is guided in the stem of the valve. The position of this cross-head on the float stem will determine the degree to which the valve may open. In the operation of the device the water under pressure passes through the opening in the valve seat and raises the valve and the water is then discharged out laterally through the openings in the valve casing leading into the tank. The degree to which the valve will open under this pressure, will depend upon the position of the cross-head on the stem of the float, which stem, as the water is flowing in to fill the tank, is in its lowest position, it resting at its lower end upon the bottom of the socket formed in the valve stem to receive the said float stem. As the water fills the tank it will rise against the float and elevate the same, and this action will lift the stem of the float and bring the bearing pins of the cross-bar or cross-head to work against the inclined or cam shaped arms of the segments, to force the same inwardly toward each other, and thus through the segments, and the circumferential ribs of the valve stem, forcing the said valve stem downwardly, to seat the valve and stop the flow of water. By the adjustment of the cross-head in relation to the cam shaped arms, the time of closing the valve may be varied. It will be observed that the valve seat being carried by the lower member, which is screw threaded into the lower end of the valve casing, directly below the valve, enables the valve seat to be readily reached for regrinding or other attention, it being only necessary to unscrew the lower member from the valve casing.

It will be understood that the invention is for use in connection with float-controlled high pressure valves in any situation where an automatic supply valve is desired, whether with flush tanks or in any other connection.

In Fig. 3 I show a modification in which the valve casing is made up of the main body portion having a portion 17′ screwed into the top thereof.

I claim as my invention:—

1. In combination a valve casing, a valve slidable in the said casing, and having a toothed stem, a pair of segments mounted on the valve casing pivotally for coöperation with the toothed stem, and having arms of cam shape, a float and a float stem and a member on the float stem slidably engaging the cam shaped arms to move them toward each other as the float rises and thus move the valve to its seat, substantially as described.

2. In combination a valve casing, a valve therein slidably mounted, and having a stem, a float having a stem guided in the valve stem, a pair of cam arms pivotally mounted and connected with the valve stem for moving said stem, and means carried by the float stem and slidably engaging the said arms to operate the valve, substantially as described.

3. In combination, a valve casing, a valve therein, a pair of arms connected with the valve for operating the valve and pivotally mounted at one end and diverging from their pivot points, a float, a stem therefor, and a cross bar adjustably mounted on the stem and slidably engaging the arms, substantially as described.

4. In combination, a valve casing, a valve therein, a pair of arms pivotally mounted and connected with the valve, a float and a connection between the float and arms adjustable along the arms to change the leverage exerted, said arms and connection having a cam engagement substantially as described.

5. In combination a valve casing, a valve therein, a pair of arms pivotally mounted and connected to the valve, a float and a connection between the float and the arms adjustable along the arms to vary the leverage and adjustable also in relation to the float, said arms and connection having a cam engagement substantially as described.

6. In combination a valve casing, a valve, a pair of valve operating levers pivotally mounted and diverging from their pivot points, a float, a stem therefor, a cross bar adjustably mounted on the stem and adjustable along the arms to different points and slidably engaging said arms, substantially as described.

In testimony whereof I affix my signature in presence of two witnesses.

WILLIAM F. KULLBERG.

Witnesses:
 WALTER DONALDSON,
 BENNETT S. JONES.

---

Copies of this patent may be obtained for five cents each, by addressing the "Commissioner of Patents, Washington, D. C."